United States Patent
Amarillas et al.

(10) Patent No.: US 7,336,514 B2
(45) Date of Patent: *Feb. 26, 2008

(54) ELECTRICAL POWER CONSERVATION APPARATUS AND METHOD

(75) Inventors: Sal G. Amarillas, San Diego, CA (US); Jimmie Asbury, San Diego, CA (US)

(73) Assignee: Micropulse Technologies, San Diego, CA (US)

(*) Notice: Subject to any disclaimer, the term of this patent is extended or adjusted under 35 U.S.C. 154(b) by 284 days.

This patent is subject to a terminal disclaimer.

(21) Appl. No.: 11/021,501

(22) Filed: Dec. 23, 2004

(65) Prior Publication Data

US 2005/0099131 A1 May 12, 2005

Related U.S. Application Data

(63) Continuation-in-part of application No. 10/461,625, filed on Jun. 12, 2003, now Pat. No. 6,836,099.

(51) Int. Cl.
*H02M 7/00* (2006.01)
*G05F 1/40* (2006.01)

(52) U.S. Cl. ..................................... 363/124

(58) Field of Classification Search ............... 363/9, 363/10, 123, 124, 125, 127, 159, 163, 165
See application file for complete search history.

(56) References Cited

U.S. PATENT DOCUMENTS

| 5,821,726 | A  | * | 10/1998 | Anderson ............... 318/809 |
| 6,317,346 | B1 | * | 11/2001 | Early ..................... 363/65 |
| 6,690,594 | B2 | * | 2/2004  | Amarillas et al. ....... 363/124 |
| 6,836,099 | B1 | * | 12/2004 | Amarillas et al. ....... 363/124 |

* cited by examiner

*Primary Examiner*—Matthew V. Nguyen
(74) *Attorney, Agent, or Firm*—Donn K. Harms

(57) ABSTRACT

An electrical power control apparatus and method for power factor correction in a conventional 60 hertz or other conventional frequency electrical AC power supply communicated to an inductive load. A plurality of interruptions of current in the line on both sides of an AC current oscillation, are created to control the power factor in a circuit energizing an inductive load. Additional power factor control and correction is provided by grounding of the line during each interruption. A controller controls the length and duration of each interruption based on preprogramming or input regarding current phase read or calculated in the line.

20 Claims, 13 Drawing Sheets

ELECTRICAL POWER CONSERVATION APPARATUS AND METHOD

This application is a Continuation in Part Application of application Ser. No. 10/461,625 filed Jun. 12, 2003 now U.S. Pat. No. 6,836,099.

BACKGROUND OF INVENTION

1. Field of Invention

The present invention relates AC electrical power which provides energy to homes and businesses. More particularly, it relates to a device and method for creating micro interruptions or micro pulsing of current in an alternating current power supply which provides the current and RMS voltage to an attached inductive or resistive or combination load being energized by the power supply. The device and method herein, by interrupting the current flow in a plurality of micro second interruptions yielding substantially equal total interrupted durations on both sides of an AC duty cycle effectively lowers the actual amount of power consumed by household and business electrical devices, while concurrently being invisible to such devices and allowing them operate within normal parameters and without damage thereto. The disclosed device in some current preferred embodiments also provides the ability to monitor and maintain individual power circuits of a home or business using individual breakers communicating with a central monitoring system. In such an embodiment the device allows for the customization of the power on individual circuits to match the load and to reduce power consumption individually on each circuit as well as monitor that circuit for malfunctions. Still further, the device and method herein disclosed and described, provides a means for power factor correction in AC circuits which ultimately will result in power savings and a more stable power grid wherein voltage current offset is a factor.

2. Prior Art

The United States and the industrialized world operate in this modern era through the use of a plethora of electrical devices which provide both controllable living environments and machines and devices which enhance and multiply the work output of the average person. Such electrical devices are conventionally powered by alternating current (AC) electrical through a building electrical system communicating electrical power from a local power grid supplying power from a generating utility device through wires, junction boxes, and electrical sockets conveniently located in the various rooms and on the external structure of businesses and homes.

In homes using conventional AC power, devices such as computers, televisions, refrigerators, air conditioners, heating devices, and untold numbers of other electrical devices, increase comfort levels and productivity. Businesses, in the same fashion, use AC power for computers, machinery, pumps, lighting, motors, and environmental heating and cooling devices as well as thousands of other devices powered by alternating current to increase the productivity of workers as well as provide a controlled environment in which workers operate.

Most such businesses and residences provide the electrical current to power the various electrical consuming devices through a plurality of circuits formed of wires which extend from a main junction box which communicates AC power from a connection to a utility grid through a plurality of circuit breakers to the individual circuits. Connection to the electrical devices to the circuit is conventionally achieved by a plug on the electrical device being inserted into a socket communicating with the individual electrical circuit. In the case of devices with a large current draw, such as air conditioners and electrical motors and other appliances requiring substantial electrical current, a permanent wired connection through a junction box may be required. The majority of electrical devices powered by alternating current from a central power grid are connected in this fashion and operate very well.

Commonly, electrical power provided by power generating companies is in the form of alternating current which in the United States alternates at a rate of 120 cycles per second or 60 Hz and in many foreign countries at the rate of 100 cycles per second or at a rate of 50 Hz. Unlike a direct current (DC) flow of electricity through a circuit that has a constant current directional flow and a constant magnitude of that current flow, an alternating current has neither a constant direction nor constant magnitude. Since alternating current flows back and forth in a circuit it has no direction, but the number of oscillations of current flow in the circuit does produce a frequency which is a component of determining the effective current in the circuit. The current (I) available in an AC circuit to provide power to run a component is generally determined as I=Imax Sin $2\pi$ FT where F equals the frequency and T equals time.

For a 60 Hz supply, used in the United States and many countries, the current builds up to a maximum in one direction and then drops to zero in the first $\frac{1}{120}$th of a second. The current then builds up to a peak in the opposite direction and again drops to zero in the next $\frac{1}{120}$th of a second, making $\frac{1}{60}$th of a second for the entire cycle. A light bulb or an electric heating element being a resistive load works equally well whichever way the current is flowing, and so do AC electric motors. Many foreign countries use a 50 Hz timing of the oscillations.

Most appliances and electronic devices used in home and business of industrialized nations have come to depend on a this constant frequency of the electrical current and use this alternation for timing purposes of the device itself or in the case of motors to actually produce the magnetic fields that turn the motor itself. This is especially true in the case of appliances and machinery using induction electrical motors which depend on the AC current being constant during cycles and oscillating at an appropriate rate. Consequently, any electrical power conservation device and method that is to be used in conjunction with AC power in conventional home and business electric devices must be invisible to the device using the provided timing or frequency of the electrical current such that the electrical device "sees" a properly timed oscillation of the provided current and therefor operate in normal parameters based on the current alternation.

Conventionally used "dimmers" frequently are not actually saving any energy as many simply use a resistor which is placed in the circuit with the light being dimmed to absorb current that would otherwise be available to the light. Newer style dimmers and power conservation devices function to chop or create a single timed large void or interruption in the current flow for a single defined period of time during one of the current cycles of an oscillation. What is effectively accomplished by this large void in current is that the maximum current available is lowered for the single duration in once cycle of each oscillation thereby lowering the current available to the device in the circuit. The output frequency is thus quite different from the input frequency. The longer the void created in the current cycle, the less current is available to the attached device, however the greater the interruption in the timing and the greater the difference between the output frequency and input frequency.

However, such devices in chopping a single segment from one side of the current cycle play havoc with electrically powered devices which depend upon the continuing and constant oscillation of the current cycle providing a timer to the attached device. Computers and induction motors and similar devices seeking the constant 60 Hz or 50 Hz cycles of line current are seriously impaired for function when a large portion of one cycle is void of electrical current. Some devices may even falsely sense that the current is reversing if the segment of current void for a sufficient time increment, thus disabling the device or even causing damage to the circuits when the current restarts.

Another serious problem arises in the use of induction style AC electric motors which are major energy consumers and thus a major target for electrical energy conservation. Such motors function by positioning windings about the armature that are spaced to take advantage of the constant timed 60 Hz or 50 Hz oscillation of the AC current supplied and the substantially equal output frequency and input frequency of the circuit. While many such motors use an auxiliary stationary winding to start the armature turning, once the desired armature speed is reached only the windings maintain the armature in the desired and proper rotation. If a conventional current interruption device such as a dimmer is inserted into the circuit providing power to an induction motor, the device only interrupts the current flow from one segment of one oscillation, or interrupts for too large a portion in both segments. This current interruption throws the current frequency out of balance and plays havoc with the fields formed inside the motor by the windings since they are spaced to take advantage of the 60 Hz or 50 Hz frequency in generating the fields around the armature. Interrupting the current flow in a single segment section during one oscillation collapses the magnetic field during the time that the current is interrupted and either throws the motor out of balance causing erratic rotation, overheating, and eventual failure of the device. Lengthening the interruption as is conventionally done with light bulb dimmers to lower the output, further increases the damage done to the running of the induction motor by further collapsing the magnetic fields and throwing the device out of balance. This is why users are warned not to place conventional dimmers in the circuit with motors or other devices that depend on a constant frequency of the AC current to function.

Still further, in using electronic devices such as computers and televisions and sound equipment and the like, industry and consumers have gone to great lengths to insure a constant and totally uninterrupted power supply even adding components to the circuit to clean up the power fluctuations. Such components generally monitor the AC current cycles for certain intervals during the output frequency and input frequency and should an interruption be sensed, the devices use batteries or other current storage devices generate a current to fill the void. Consequently conventional dimmer style current interruption devices will not function upstream in the power suppled in such a circuit since the subsequent device downstream in the circuit tries to undo the interruption of current which the dimmer chops from one side of the AC oscillation.

The device disclosed herein provides a significant saving in power consumption and solves the problems of AC current interruption causing damage to components. The disclosed device also provides great ability to manage AC power communicated to a single device or to an entire house or building using a plurality of short micro interruptions of the current flow during both phases of the current oscillation of an AC line current. By interrupting the current for a plurality of micro second segments for a substantially aggregate equal amount of time on sides of the oscillation in a complete one second or otherwise timed AC cycle, the perceived output frequency from the disclosed device sensed by the attached AC electrical device is maintained substantially the same as the input frequency and the effective current and the RMS voltage, provided to, and used, by a circuit or component, is lowered. However, unlike conventional power chopping devices which interrupt the current for a single longer or shorter period on one oscillation of a frequency cycle, the disclosed device micro chops the current, and does so for a substantially equal total duration and substantially equal number of micro second durations on both oscillations of each cycle. The result being that the AC output frequency "seen" by the attached electrical device is substantially equal to the AC input frequency but the effective current provided and the RMS voltage is reduced. Due to the micro second durations of the current interruption, and the fact that both sides of each AC cycle are substantially equally interrupted with micro interruptions yielding substantially the same aggregate duration of interruption, the interruptions are invisible to the attached device. The AC device in the U.S. requiring a normal 60 Hz frequency rate thus functions normally but uses less electrical current and at a lower RMS voltage. Even devices such as electrical line conditioners or uninterruptible power supplies, which sample the current and frequency of the AC oscillation to ascertain voltage and frequency, do not see the interruptions since there is a plurality of short micro second interruptions in the current flow which are generally faster than the sampling rate, and, the interruptions occur on both the output and return sides of the circuit to yield substantially equal aggregate amounts of current interrupted on both sides of the oscillation of the AC current during the one second duty cycle.

The current best mode features a switching means capable of making current interruptions which are micro seconds in duration, occurring in a range from 10 to 100 times on each cycle with one half of the interruptions being on the negative oscillation and one half being on the positive oscillation each individual AC current cycle. Such micro second interruptions can be made in both single and multiple phase AC power supplies such as the conventional three phase power supplies used by large motors. One current preferred mode features fifty such micro chopping current interruptions per cycle however this may be adjusted in the aforementioned range depending on the current and voltage requirements of the circuit. Since each complete cycle of a conventional 60 Hz AC circuit used in the United States takes only one second, the duration of each of the twenty-five interruptions on both oscillations is extremely short. Further, since there are so many short interruptions, lengthening or shortening each interruption varies the effective maximum current available to the circuit widely without causing the devices attached to sense an end to the negative or positive oscillation of the cycle. As such, the device and method can vary the length and number of the micro interruptions of current to yield the RMS voltage and current required to run the load placed on the circuit being served by the device. A very short relative increase in current interruption time on each of the 50 such interruptions will thus combine to yield a larger total aggregate effect on the maximum available current. Conversely, a small adjustment to shorten the interruptions yields a substantial adjustment to increase the aggregate total of current available. The result being a highly adjustable circuit which allows attached electrical devices to function in normal parameters with the minimum required current and RMS voltage to achieve that function once the circuit output is adjusted.

Of course the system in the current best mode interrupts the current flow for micro seconds on both sides of the current flow of the conventional AC circuit to yield the best and most transparent current flow reduction and the best control on the system for varying loads added or subtracted from the circuit. However it is envisioned that some may not need such a balanced system that is invisible to the load and it is anticipated that a reduction in power usage could be obtained micro chopping only one half of the oscillation when used only on resistive loads such as a light dimmer and such is anticipated. However, the current best mode of the device features substantially equal total duration of current interruption through substantially equal numbers of micro interruptions in the current flow on each side of one AC current cycle.

The effective current available to the circuit using the disclosed device can be static and non adjustable in the simplest form of the device by simply programming the number and duration of timed micro-interruptions to achieve the desired static output of current and RMS voltage to the device or devices attached to the output side of the device. In this simple form, a switching means capable of handling the amount of line current and the and making the extremely short interruptions would be used and timed or controlled at a set pace to yield the desired current and line voltage on the output side. This embodiment might be used when the device is placed on an AC motor or in front of a single attached device downstream on an AC circuit. Or, as in the current best mode, the output current to the load on the circuit and returning current when the flow is reversed, may be monitored and the durations and/or number of micro interruptions in the current flow provided by the switching means may be increased or decreased as needed by for operation of attached devices to the circuit being monitored. This circuit monitoring can be accomplished by a feed back circuit communicating with one of the wires on the output side of the switching device and with a timer and/or computer controller which controls the number, and/or duration, of the micro interruptions in each oscillation of the AC cycle through a constant communication with the switching means which cuts or interrupts the current flow in the circuit. If less current and effective RMS voltage is needed by the attached electrical device, then the number and/or duration of the interruptions of current flow would be increased by a command to the switching devices. Should more current and effective or RMS voltage be required by the attached device, then the number and/or duration of the interruptions would be decreased. If the attached electrical device requires an especially clean power supply, the number of micro interruptions can be increased and shortened to a point where the interruptions of current are invisible to the electrical device but still using less power.

As noted, by interrupting each oscillation of the current, a substantially equal number of times, for substantially equal micro second durations, thereby yielding a substantially equal aggregate amount of current interruption, the interruptions are essentially invisible to the attached device since no "reversal" of current is sensed by the attached device as would be the case where one or a few very long interruptions occur in the current.

The disclosed device works equally well when inserted into three phase and other multi phase versions of AC power supplies.

Consequently using the disclosed device and method, computers, induction motors, and other device which are very sensitive to current oscillation and assuming a current reversal at a defined period of time of interruption, only sense the lower current and effective voltage available from the output side of the device and thus function otherwise within normal parameters.

U.S. Pat. No. 4,616,301 (Small) teaches a switching power supply for converting an input voltage to a different output voltage. However, Smith teaches a constant pulse or current interruption duration and varying the frequency of the line output and requires a power transformer and chokes to accomplish the task. This makes the device bulky and yields the potential of damage to frequency specific devices such as induction motors and computers.

As such, there exists a need for an easily manufactured device which may be readily inserted into a single or multiple phase AC circuit of a home or business and reduce the power consumption of the attached electrical components. Such a device should be invisible to the electrical components attached to the circuit, or be adjustable to achieve such, and must maintain the component perceived line output frequency to avoid malfunction or damage to the attached electrical components. Such a device in more sophisticated embodiments should provide constant monitoring of the circuits in which it is inserted, provide the minimum current to the load on the circuit to function normally, and constantly adjust to any changes in the load of the circuit. Also, in the more sophisticated embodiments, such a device should have a means to eliminate residual energy from the circuit during the periods of current interruption. Additionally, such a device should be able to function as both circuit breaker and circuit monitor providing real time analysis and telemetry regarding the usage and function or malfunction of the individual circuits in which the device functions. Still further, such a device should be capable of not only providing energy savings, but to also provide a means of power factor correction in AC circuits which may be inefficient due to inductive loads.

SUMMARY OF THE INVENTION

Applicants' device provides an economical and easily installed AC current monitoring and power usage reduction device which provides for preset or continual monitoring of the load requirements downstream from the device and for adjustment of the current and RMS voltage provided thereto. It can be configured for insertion into a standard junction box or custom configured to the indented circuit or included in the actual manufactured electrical devices such as AC motors. Using virtually the same components, or with a few substitutions or additions, the device can also function as a plurality of other electrical components such as a light dimmer, voltage regulator, precision motor controller, line conditioner, or circuit breaker with local or remote switching capability. It can also function as a dual device rendering such other electrical components energy saving.

As an energy saving component, the device functions by causing a plurality of short or micro second or interruptions of the current flow in a single phase or multiple phase AC circuit, the device lowers the current provided and effective voltage and power consumption by the attached load while remaining invisible to the attached load through the provision of micro second interruptions of current on both sides of an AC oscillation during each individual AC cycle, thus balancing the output.

Still further, in more sophisticated embodiments, monitoring of the voltage provided to the attached load by a controller allows for continual adjustment of the timing and duration of the current interruptions to yield maximum power savings while preventing damage to the attached components of the load. The addition of clamp circuits and timed circuits to eliminate residual electrical energy in the line during the micro interruptions of current flow, further enhance the abilities of the device.

Additionally, it has been found with experimentation, that as an energy savings apparatus, the device herein also functions to provide heretofore unobtainable power factor correction in an AC circuit feeding an inductive load such as an electric motor.

Power factor is the ration between the KW and the KVA drawn by an electrical load where the KW is the actual load power and the KVA is the apparent load power. Power factor is essentially a measure of how effectively the current is being converted into useful work output and more particularly is a good indicator of the effect of the load current on the efficiency of the supply system.

All current will causes losses in the supply and distribution system. A load with a power factor of 1.0 is generally accepted as the most efficient loading of the supply and a load with a power factor of 0.5 will result in much higher losses in the supply system. A poor power factor can be the result of either a significant phase difference between the voltage and current at the load terminals, or it can be due to a high harmonic content or distorted/discontinuous current waveform. Poor load current phase angle is generally the result of an inductive load such as an induction motor, power transformer, lighting ballasts, welder or induction furnace. A distorted current waveform can be the result of a rectifier, variable speed drive, switched mode power supply, discharge lighting or other electronic load.

Poor power factor due to an inductive load is conventionally improved by the addition of power factor correction but, a poor power factor due to a distorted current waveform requires an change in equipment design or expensive harmonic filters to gain an appreciable improvement. In circuits with an inductive load, capacitive power factor correction as been conventionally employed as a means of reducing the inductive component of the current and thereby reduce the losses in the supply. However, capacitive correction of the power factor has always suffered from severe limitations.

An object of this invention to provide a power saving device easily insertable or adaptable with conventional AC power circuits into which it is to be inserted.

Another object of this invention is remaining invisible to the load using a plurality of micro second interruptions of AC current on both sides of the AC current oscillation in a single or multiple phase power supply to an attached load.

A further object of this invention is the ability to centrally monitor the current used on individual circuits of a multi circuit installation.

Yet another object of this invention is the provision of an energy saving electronic device which will concurrently function as a plurality of devices such as a voltage regulator, dimmer, motor controller, and other such devices.

An additional object of this invention is to provide for more efficient operation of induction loads through the use of both micro second interrupted current and elimination of residual energy in the line during such micro second interruptions.

Yet another object of this invention is to provide for power factor correction in AC circuits having inductive loads or other circuits which create voltage current offset.

With respect to the above description, before explaining at least one preferred embodiment of the invention in detail, it is to be understood that the invention is not limited in its application to the details of construction and to the arrangement of the components or steps set forth in the following description or illustrated in the drawings. The various apparatus and methods of the invention are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other devices, methods and systems for carrying out the several purposes of the present disclosed device. It is important, therefore, that the objects and claims be regarded as including such equivalent construction and methodology insofar as they do not depart from the spirit and scope of the present invention.

Further objectives of this invention will be brought out in the following part of the specification, wherein detailed description is for the purpose of fully disclosing the invention without placing limitations thereon.

BRIEF DESCRIPTION OF DRAWING FIGURES

Figure 4:
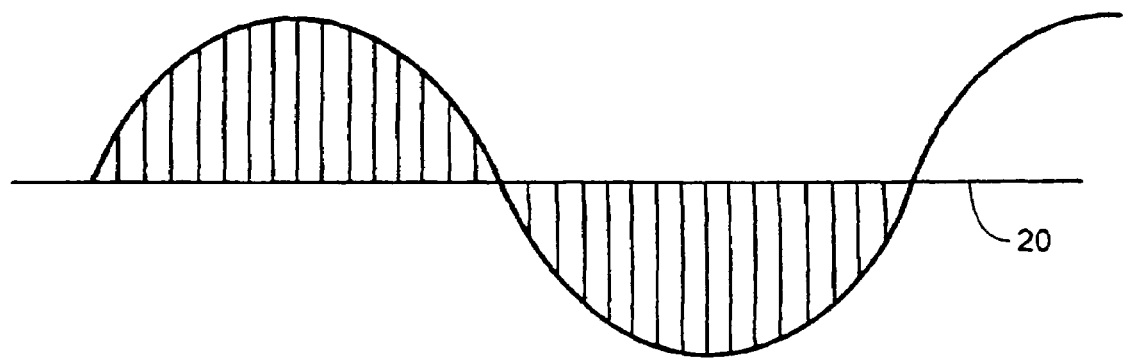

FIG. 4 graphically depicts the substantially equal current interruptions provided by the controlled switching means during both oscillations of a conventional AC frequency cycle.

Figure 5:
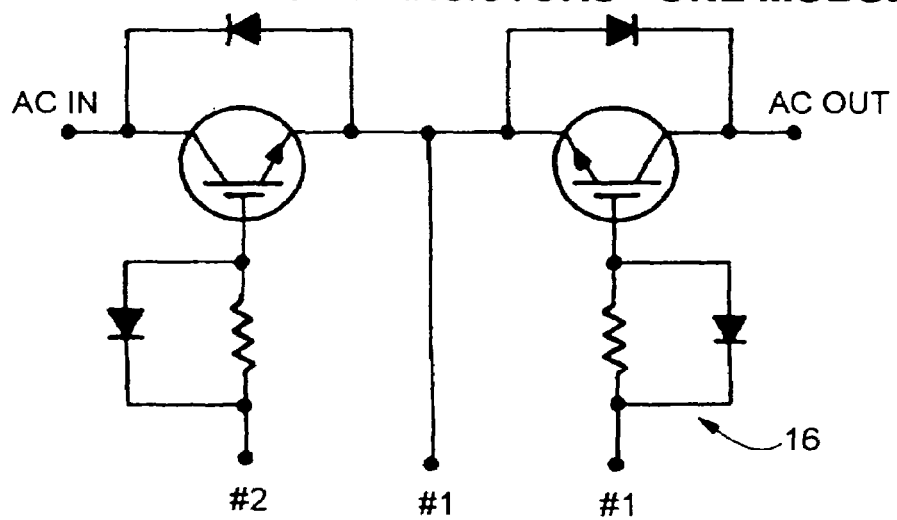

FIG. 5 depicts a simple embodiment of the switching means.

Figure 6A:
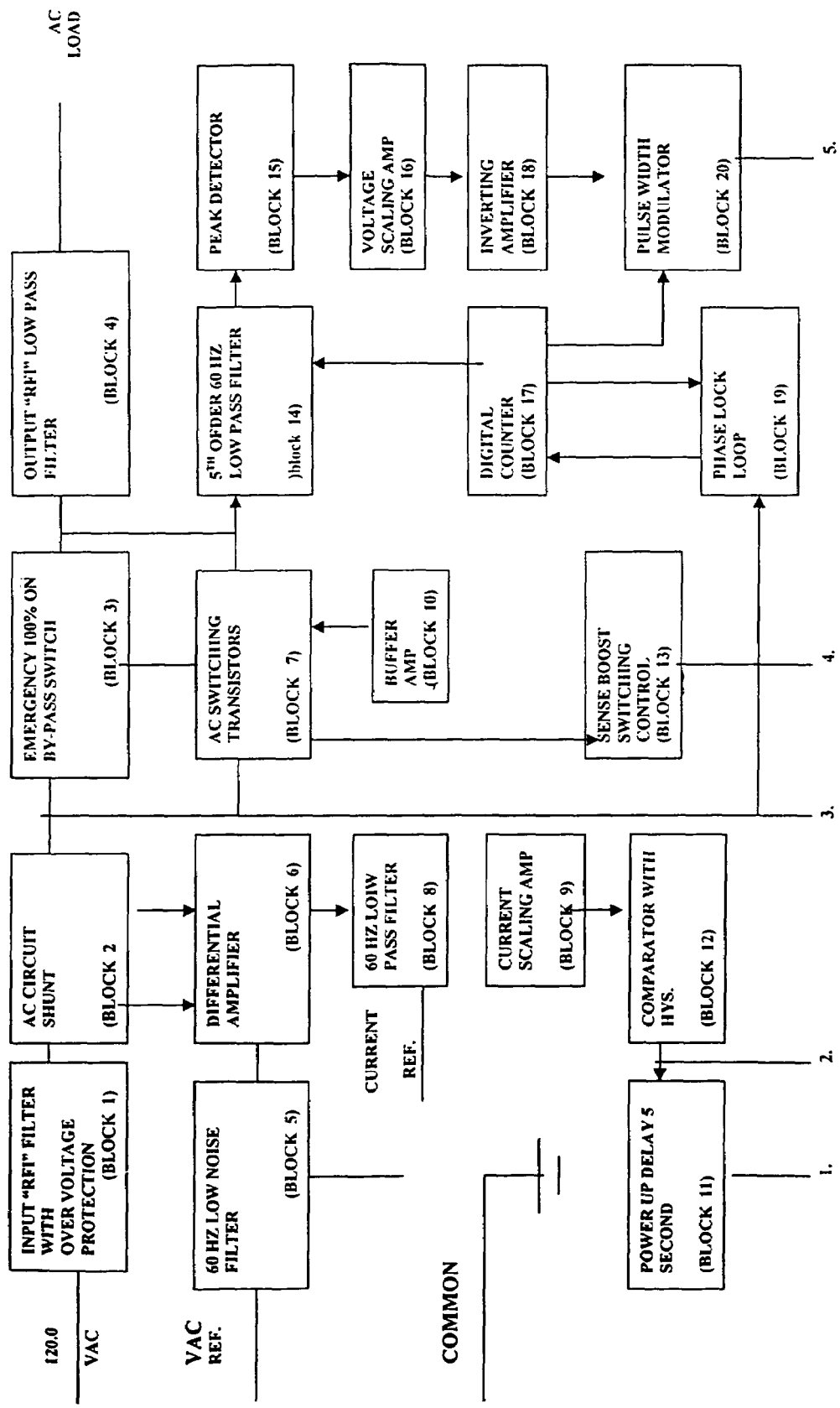
Figure 6B:
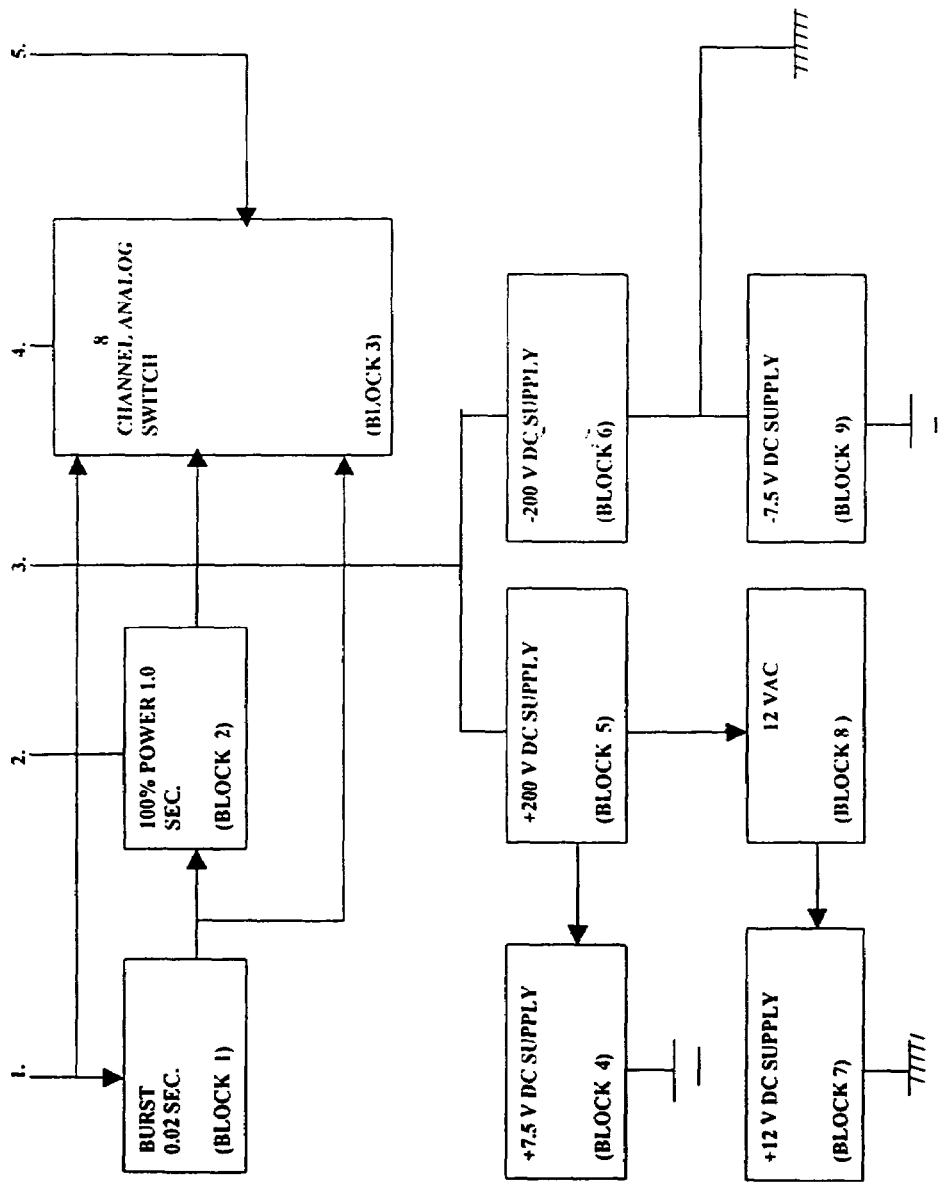

FIGS. 6A and 6B show an embodiment of a control means for controlling the timing and duration of current interruptions provided by the switching means and providing the additional ability to monitor and adjust the circuit to the load.

Figure 7:
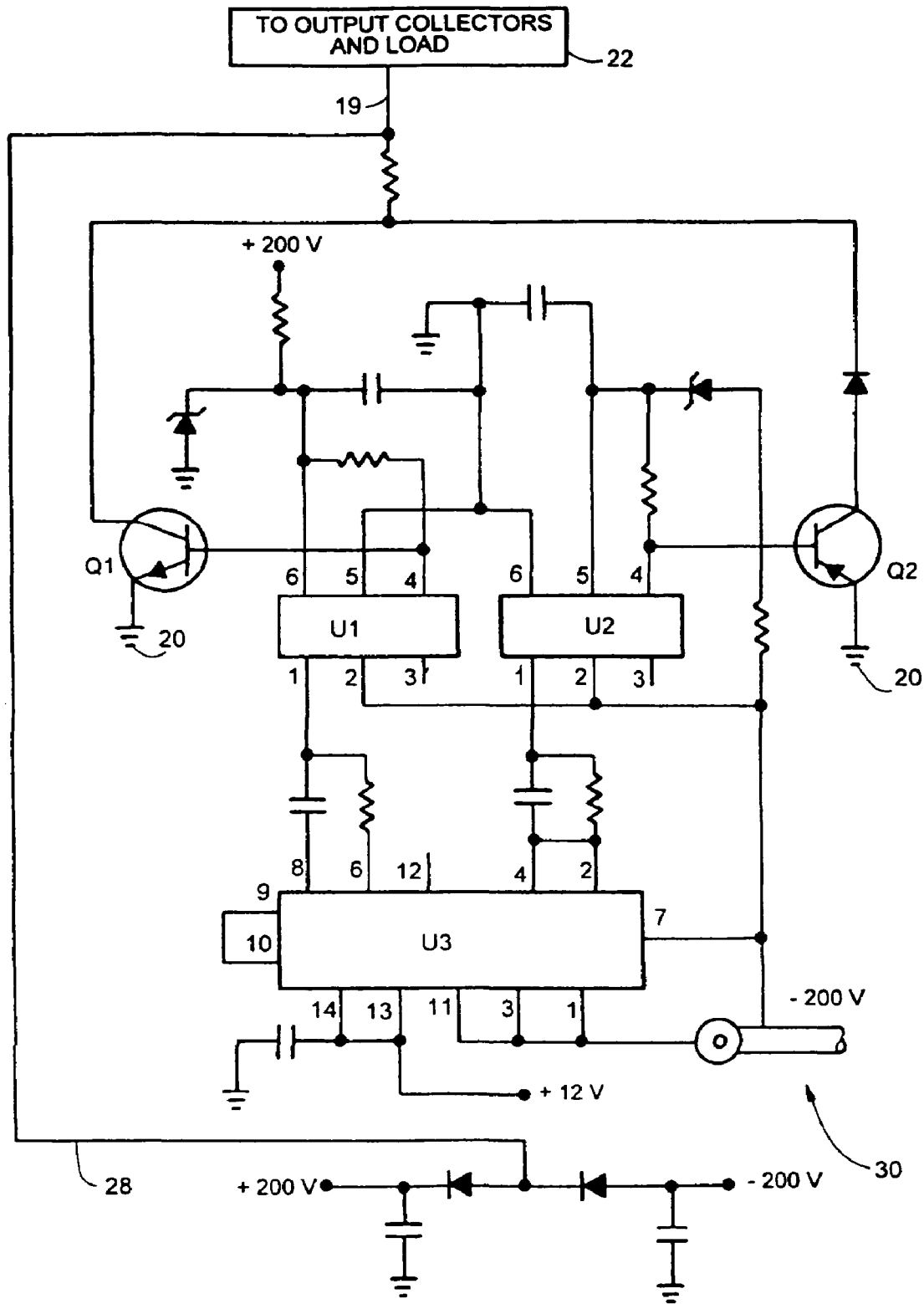

FIG. 7 depicts a clamping circuit and an intermittent grounding circuit.

Figure 8:
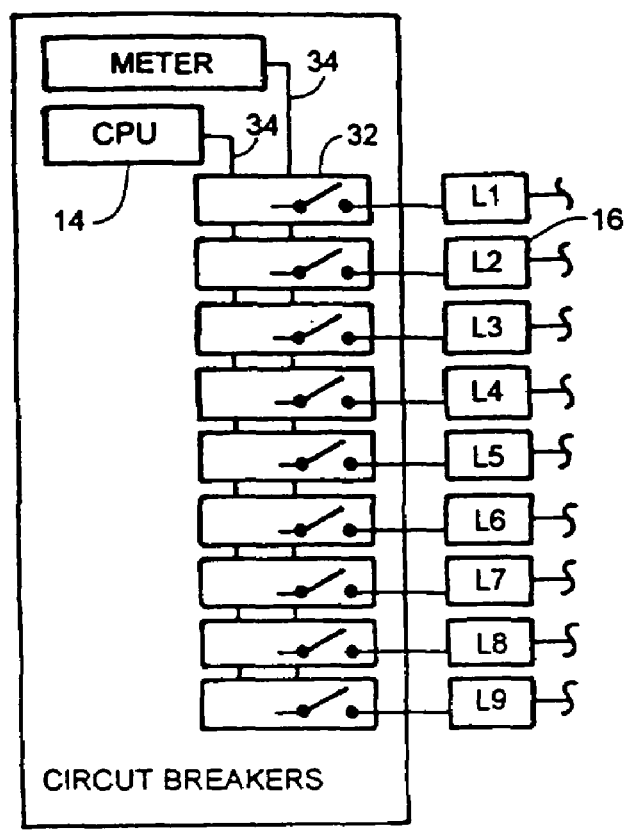

FIG. 8 shows the device installed in the form of a conventional circuit breaker attached to the bus bars of a conventional junction box to serve individual circuits.

Figure 9:
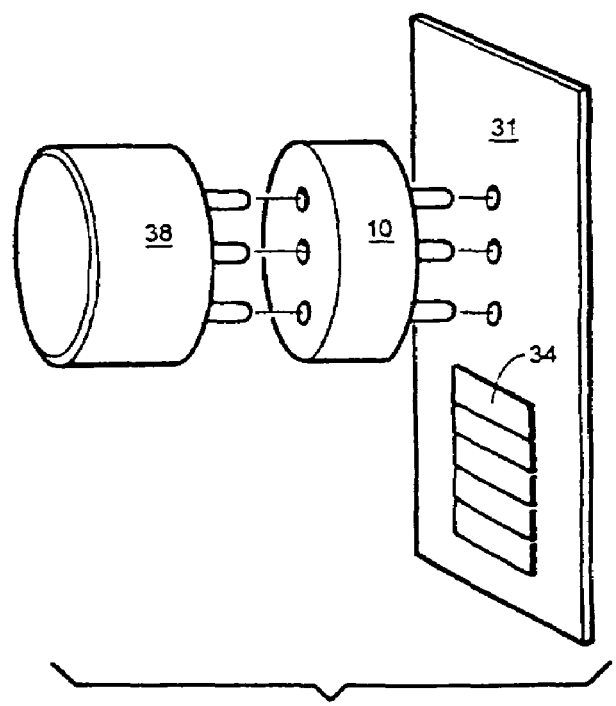

FIG. 9 depicts the device as an interface between a conventional power meter and a junction box.

Figure 10:
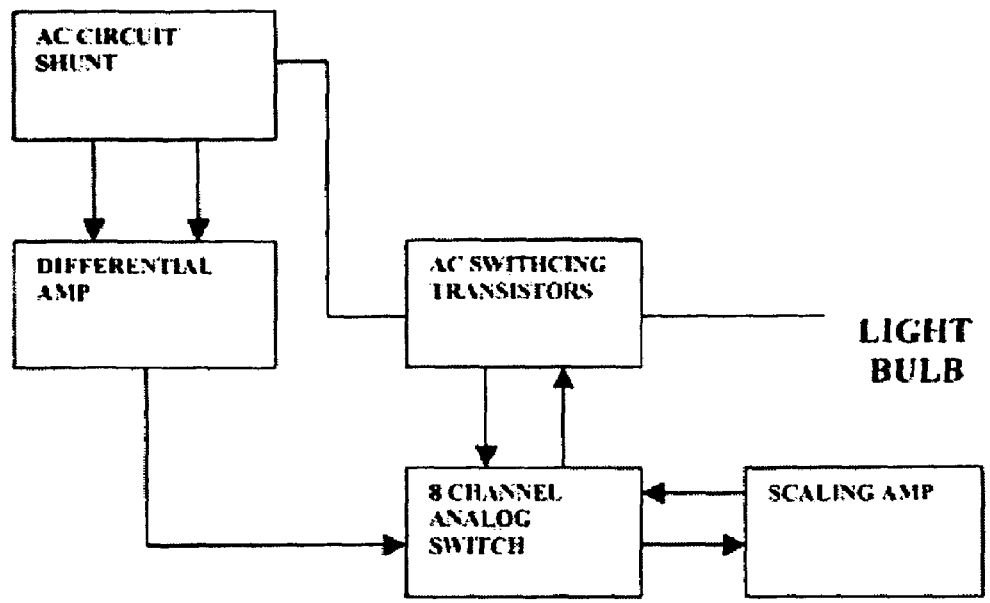

FIG. 10 depicts an embodiment of the device used for a light dimmer or combination dimmer energy saver utilizing the majority of components of FIGS. 6A and 6B.

Figure 11:
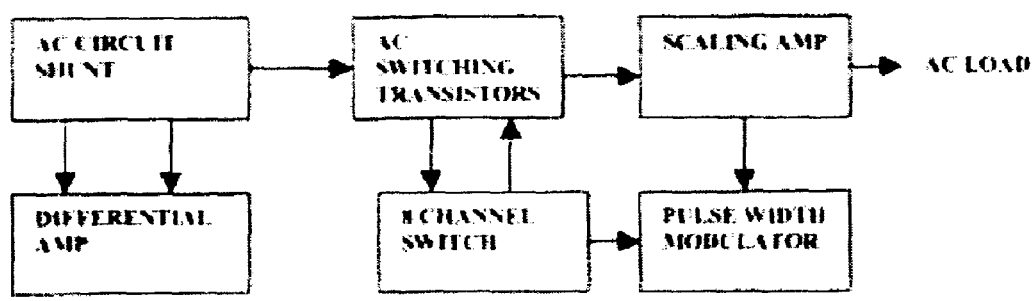

FIG. 11 shows an embodiment of the device which would function as a voltage regulator utilizing the major components of FIGS. 6A and 6B.

Figure 12:
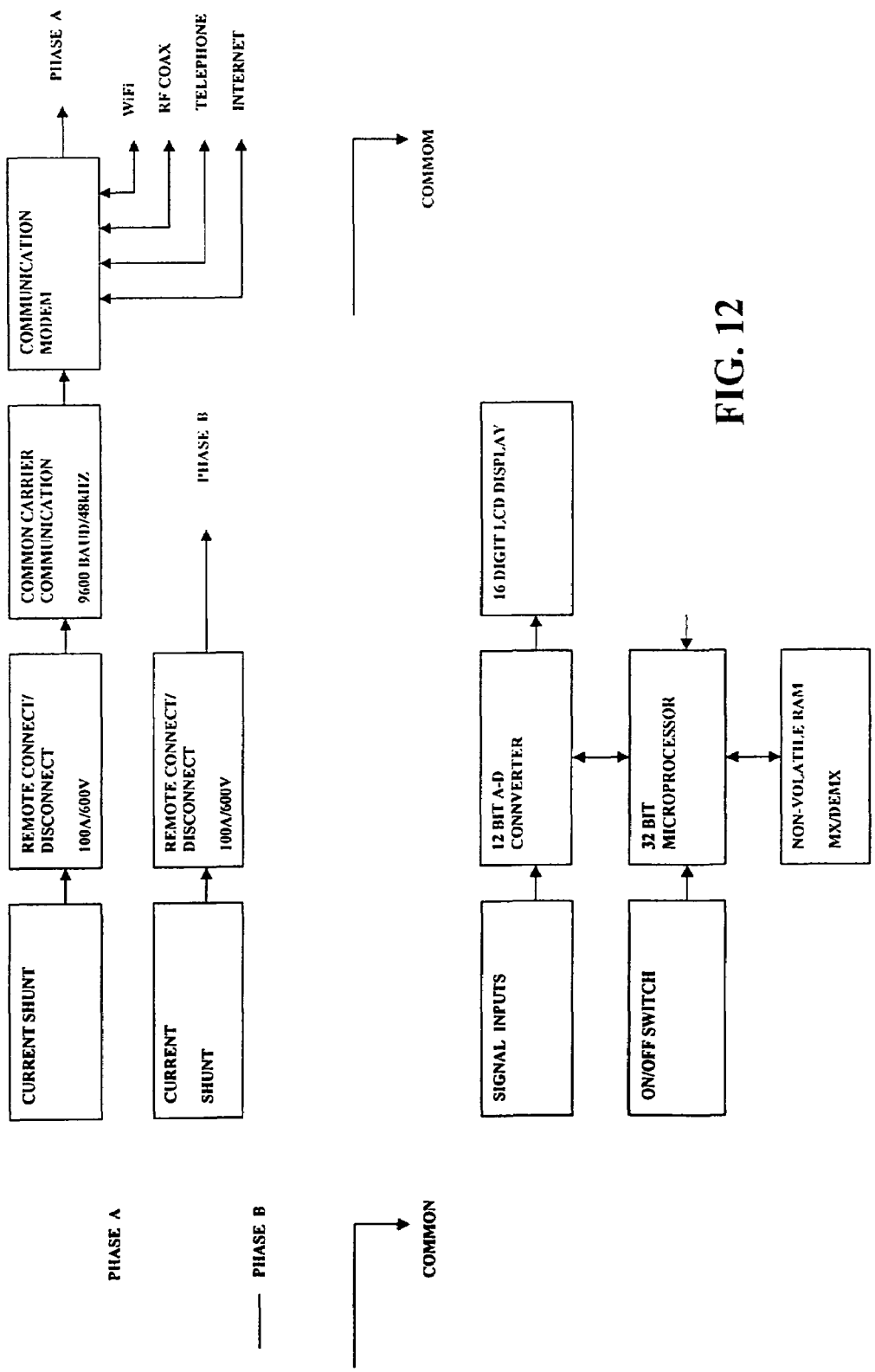

FIG. 12 depicts how the device would work as a remote circuit breaker and energy consumption reporting device and in FIG. 10 in conjunction with the major components of FIGS. 6A and 6B.

Figure 13:
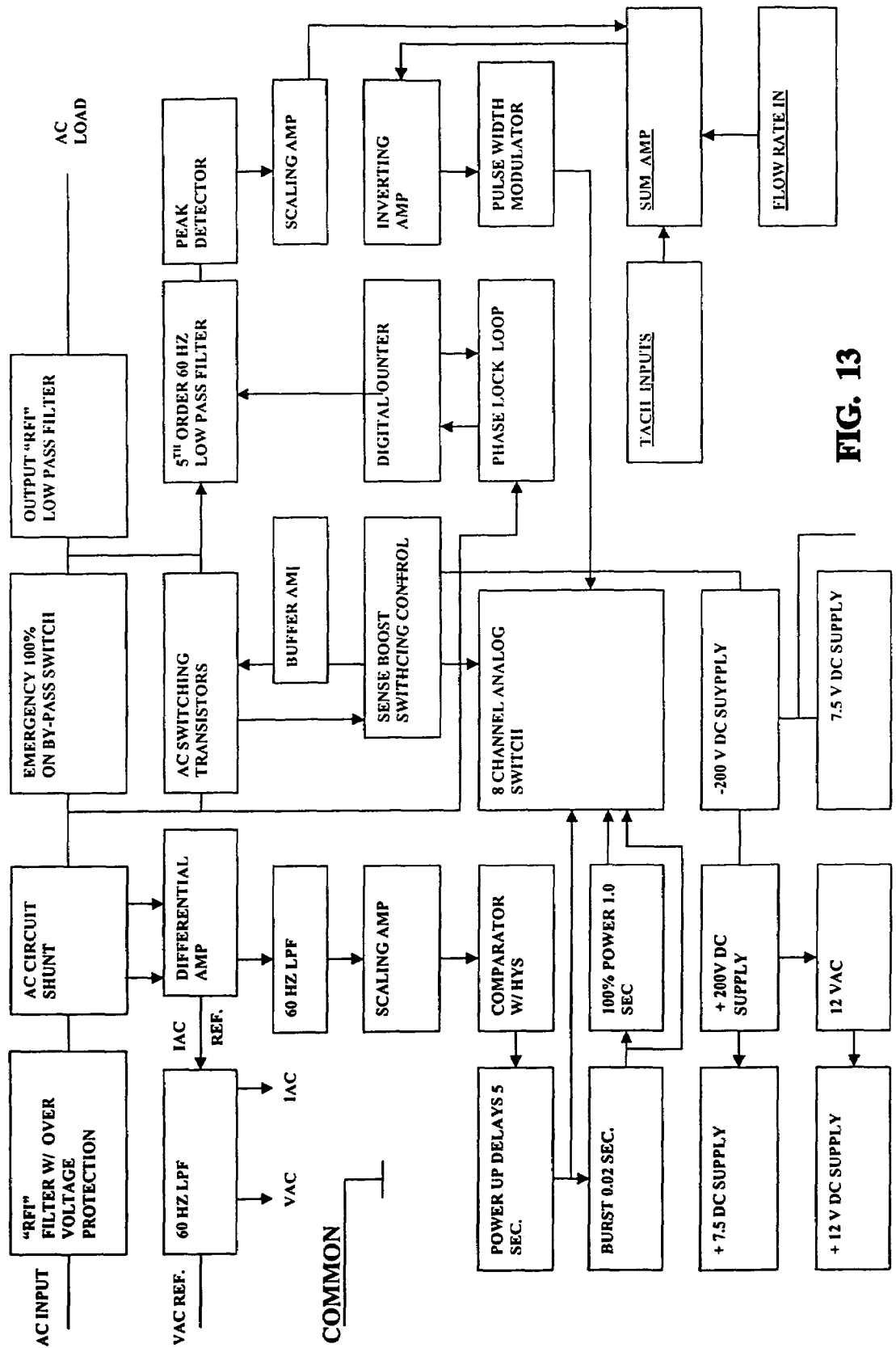

FIG. 13 depicts the device of 6A and 6B used for a motor controller.

Figure 14:
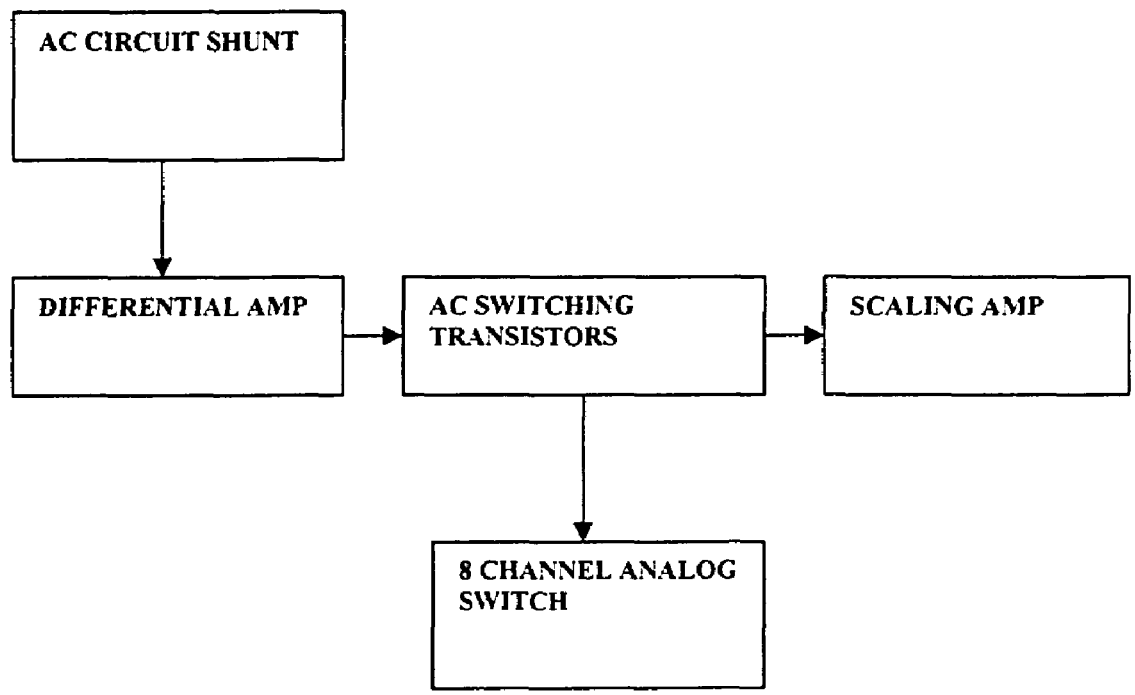

FIG. 14 shows a resistance load energy saver used in combination with the major portions of FIGS. 6A and 6B.

Figure 15:
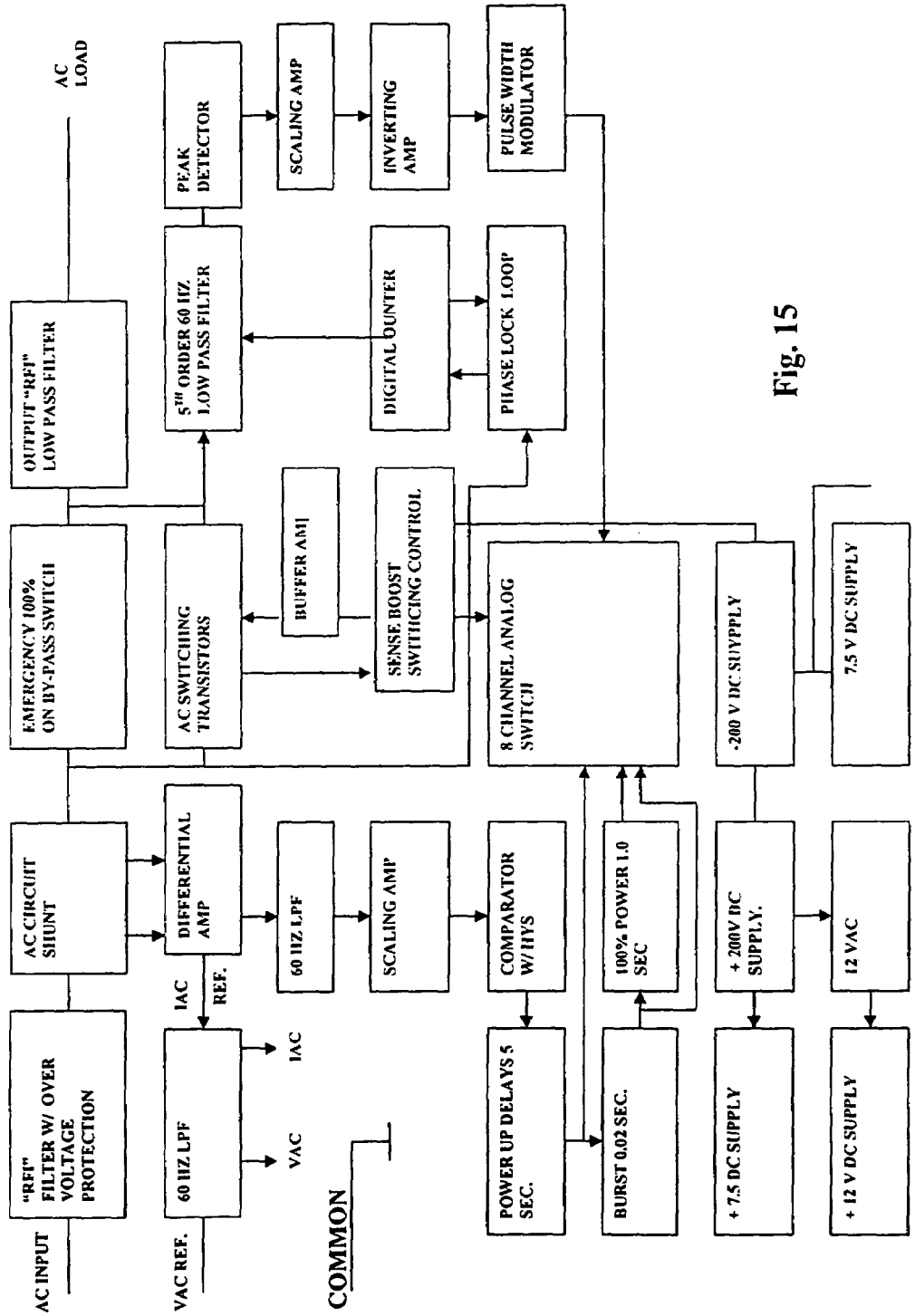

FIG. 15 depicts the device used for line conditioning which functions substantially the same as the device of FIGS. 6a and 6b and uses the novel AC switching herein disclosed.

Figure 16:
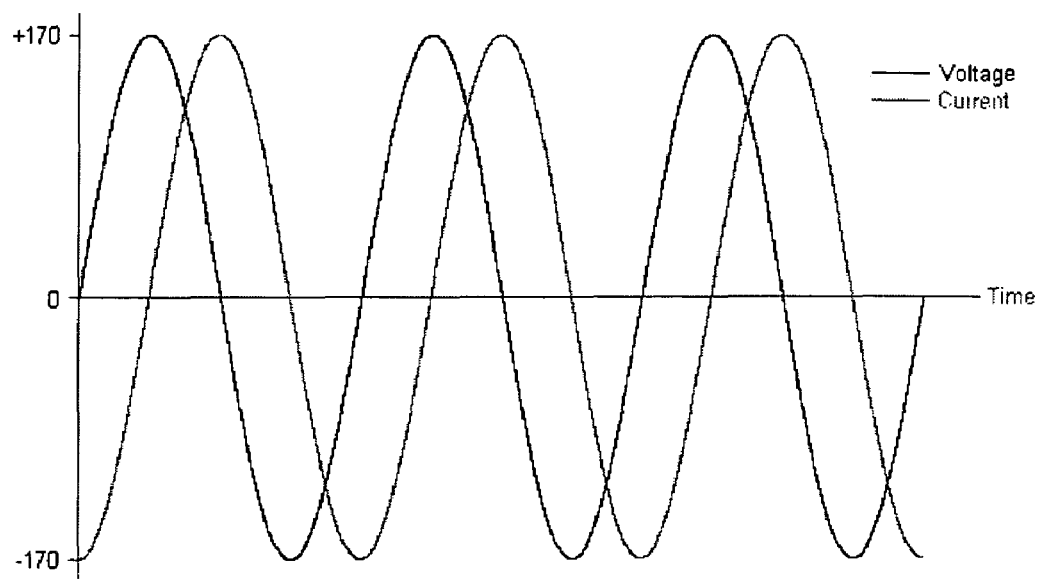

FIG. 16 depicts a graphic depiction of the voltage and current offset resulting in the need for a power factor correction.

Figure 17:
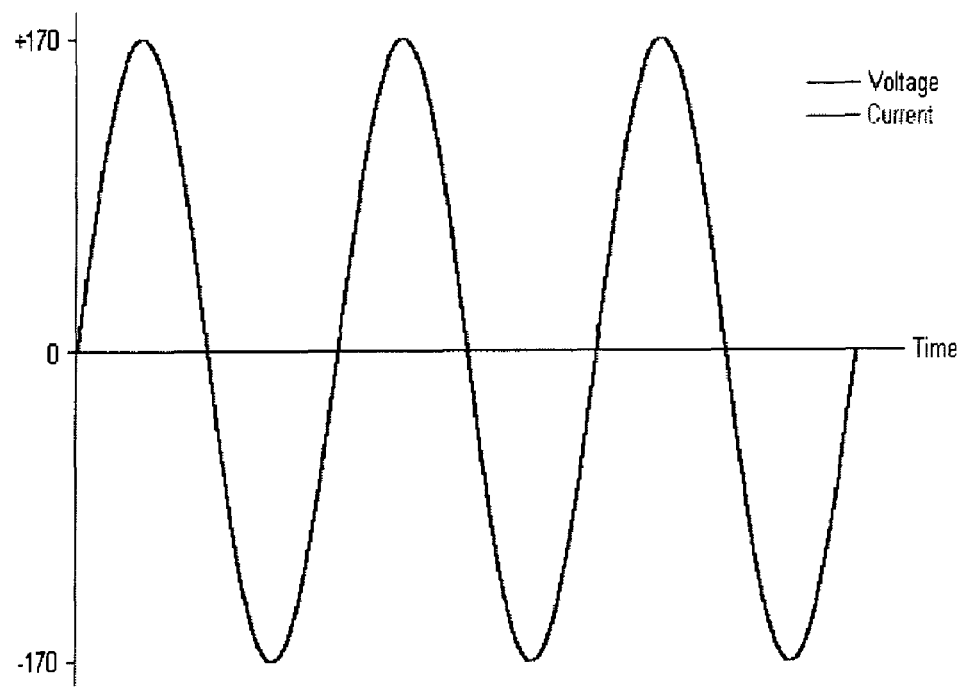

FIG. 17 depicts a graphic depiction of a power factor of 1.0 where the voltage and current offset has been optimized by the device herein.

Figure 18:
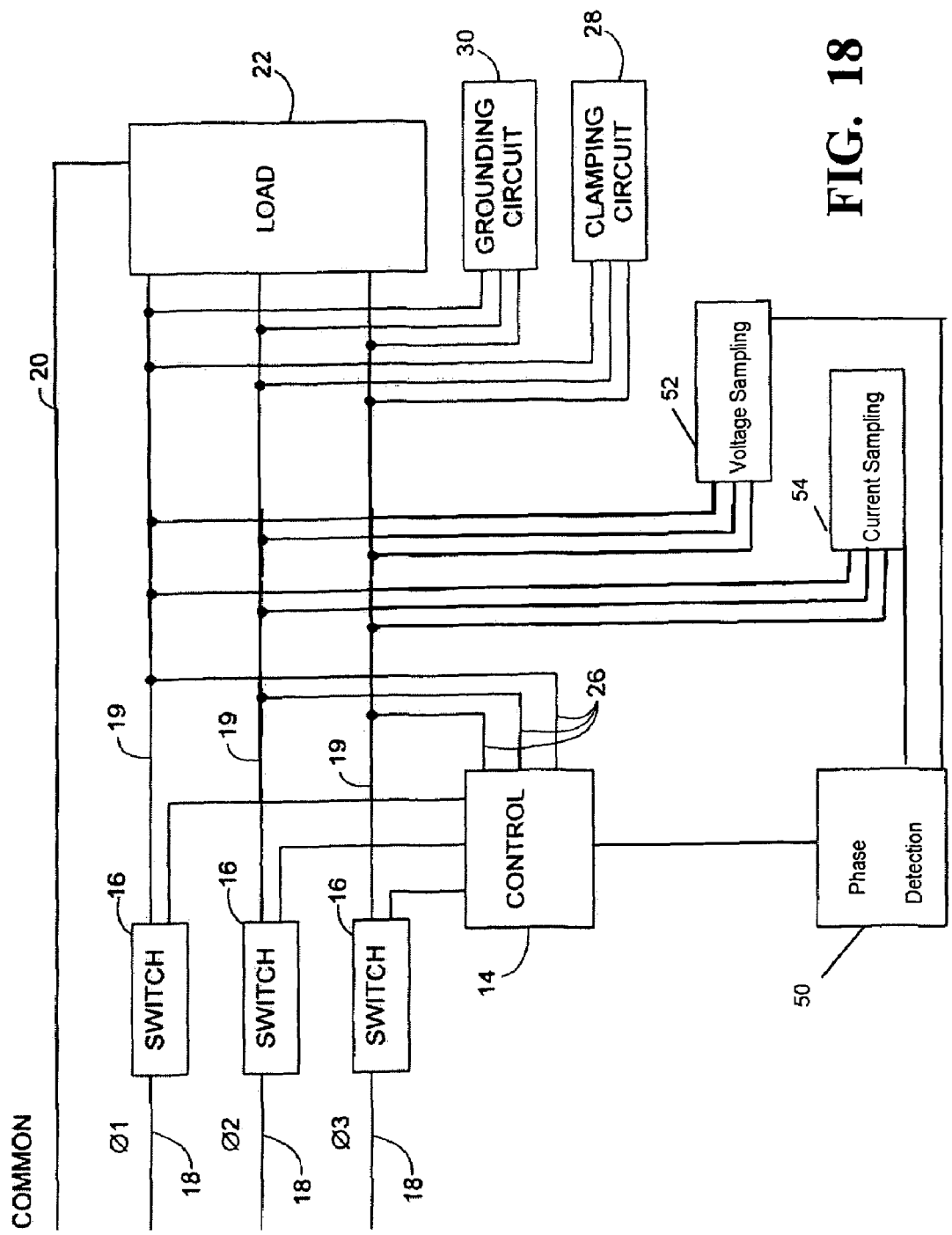

FIG. 18 depicts the device optimized for phase correction.

DETAILED DESCRIPTION OF THE PREFERRED EMBODIMENTS OF THE INVENTION

Figure 1:
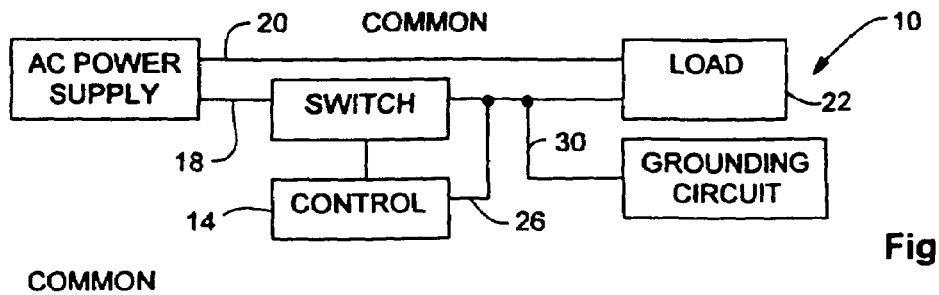
FIG. 1 is depiction of the device in its simplest embodiment featuring a control unit operating a switching means interrupting current flowing in an AC circuit for a plurality of micro second increments on both sides of an AC cycle.

Referring now to the drawing FIGS. 1-9, which depict the current preferred embodiments of the device disclosed herein, specifically FIG. 1 is component depiction of the device 10 in its simplest embodiment featuring a control unit 14 operating a switching means 16 interrupting current flowing in an AC circuit for a plurality of micro second increments. The device is pictured with a switching means 16 interrupting current flow in an AC circuit 12 comprising a live or energized wire 18 and a neutral wire 20 and is depicted interrupting the live or energized wire 18 rather than the neutral wire 20 or ground which provides for the other half of the circuit for electrical energy provided to the load 22 from an AC power supply 24 such as the conventional power grid from a power plant. While insertion into the energized wire 18 on multiple phased circuits with multiple energized wires 18 works best due to the fact that less current needs to be switched, when used in a two-wire single phase circuit the switching means 16 could also be inserted into the neutral wire 20 or on the neutral wire 20 of multi phased circuits so long as the switching means 16 will handle the current from the two or three energized wires in the circuit. The device 10 could be provided with a controller 14 in the simplest form which is preprogramed or pre configured to predetermined parameters to interrupt the current flowing in the circuit 12 between the energized wire 18 to the load 22 and back through the neutral wire 20 for predetermined plurality of micro second interruptions during both sides of or directions of the AC current flow during the conventional one second AC cycle duration if used on a conventional AC circuit from a power plant. Of course those skilled in the art will no doubt realize, that other durations for the AC cycle might be used depending on the circuit and load attached and such are anticipated.

In a preferred embodiment of the device 10, somewhat more complicated but yielding more control, a feed back circuit 26 would be provided to monitor the line conditions for voltage and/or current and continually adjust the switching means 16 and micro second current interruptions to yield proper current and RMS voltage for the attached load 22. Currently, maintaining and RMS voltage of substantially 105 volts works best and is achieved by the controller 14 adjusting the number and duration of micro second interruptions on each side of the AC current flow during one cycle to yield substantially equal numbers of interruptions for a substantially equal total aggregate current interruption time to maintain current that RMS voltage. However, those skilled in the art will see that other voltages might be used depending on the load 22 and performance and requirements thereof when attached in the circuit 12 and such is anticipated.

Figure 2:
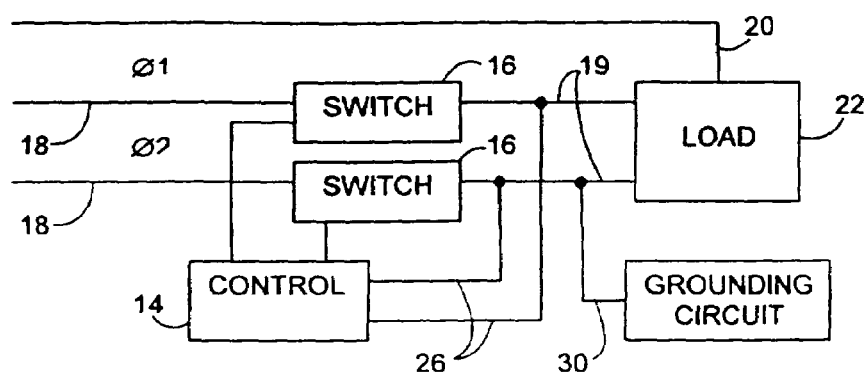
FIG. 2 depicts the device inserted into a circuit having two energized legs or wires.
Figure 3:
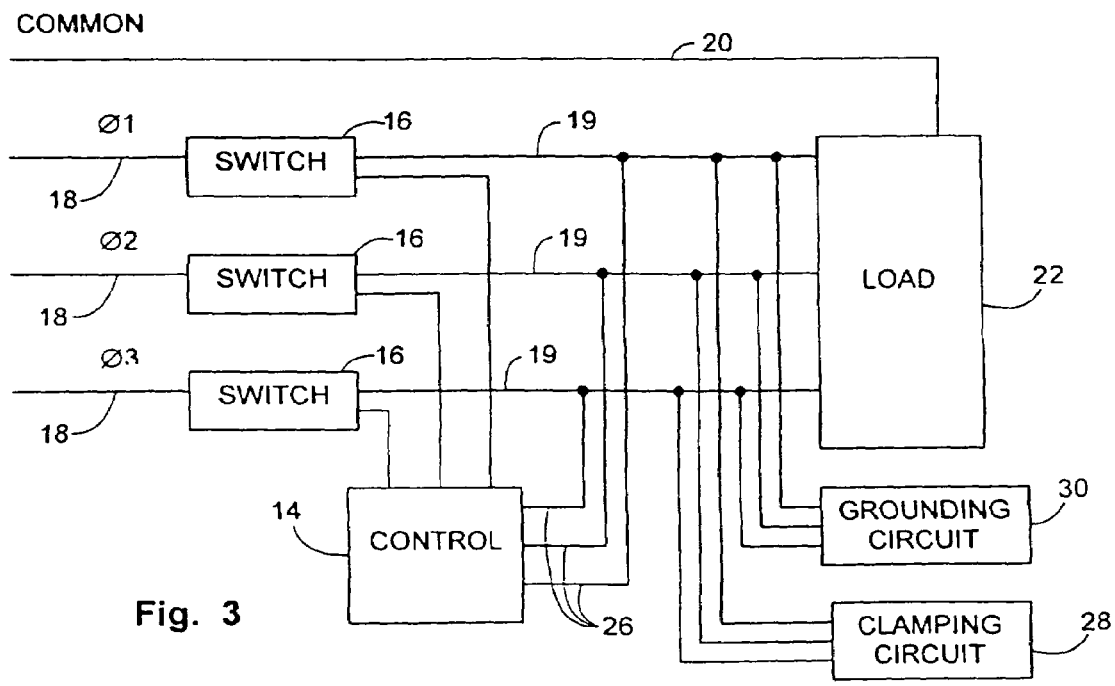
FIG. 3 depicts the device inserted into a circuit having three energized legs or wires.

As noted above, the device 10 interrupts the current in both directions of the AC current flow yielding a balanced and substantially equal voltage and current flow duration on both sides of the current oscillation during each conventional one second duty cycle of an AC current flow. By providing current interruptions for a plurality of substantially equal micro second intervals, on both sides of the current oscillation, for a substantially equal total current interruption on both sides of the current oscillation, as graphically depicted in FIG. 4, the interruptions remain substantially invisible to the load 22 attached to the circuit 12. This solves the problem caused by prior art that uses one or few very long current interruptions which can cause the aforementioned failures on the device using the current. Of course multiple switch means 16 on one or both legs of a two-phase circuit 12 to the load may be used to adjust for the different characteristics the load component requires and for different current and voltage requirements of the circuit as depicted in FIG. 2. However in the current best embodiment for insertion into a two-phase 120 volt circuit 12, a two-phase 220 volt circuit as pictured in FIG. 2, or a three-phase circuit having three energized wires 18, as depicted in FIG. 3, the switching means 16 controlled by one or a plurality of controllers 14, is placed to interrupt the current flow communicated from the power supply 24 through each energized wire 18 to the load 22. An example of a preferred switching means 16 for making the micro second interruptions in AC current flow is shown in FIG. 5 however those skilled in the art will realize that other designs for such switches can be employed so long as they will handle the micro second durations and current flow requirements, and such is anticipated.

Also depicted in FIGS. 1-3 and shown in more detail in FIG. 7 are two optional circuit means which provide additional advantages when included in the device 10. A means to clamp voltage in the energized output wire 19 communicating between the load 22 and the switching means 16 is provided in the form of clamping circuit 28 which clamps the voltage at plus or minus 7/10 of a volt of the input voltage provided from the power supply 24 communicated to the switching means 16. This prevents potential problems that might be incurred, especially with a load 22 that is inductive in nature from voltages that might develop in the energized output wire 19.

An additional and even more useful optional component to be included in all embodiments of the device 10 would be a means to eliminate residual energy in an inductive load in the form of a circuit to ground the output wire 19 only during the time intervals when the switching means 16 has opened the circuit and de-energize the output wire 19. In operation, when the switching means 16 cuts current to the output wire 19, the grounding circuit 30 grounds the output wire 19 and thereby removes any residual electrical energy created as a byproduct of the electrical energy generated by motor inductance when power in the output wire communicating with the inductive load is switched off. Such energy causes field magnetic field eddies in inductive motors which tend to pull the armature in the opposite direction from the desired rotation of the motor and decrease efficiency of the inductive motor as well as heating up the inductive motor. By grounding the output wire 19 only during the time intervals of the micro second current interruptions caused by the switching means 16 opening the circuit, the residual electrical energy is removed from the inductive load thereby increasing the efficiency of inductive loads such as electric motors. The control means 14 would of course be the source of the signal for both the opening of the circuit by the switch means 16 and the concurrent grounding of the output wire 19 caused by the same signal to the grounding circuit 30. When the signal to the switching means 16 from the control means 14 is reversed causing the switching means 16 to close and energize the output wire 19, the same signal would cause the grounding circuit 30 to disengage. Of course those skilled in the art recognize that other circuits could be designed and utilized. It would thus be highly preferred to include the means for intermittent grounding of the output wire for elimination of residual energy in the circuit during time durations when the switching means has de-energized the output wire 19.

FIG. 6 depicts a current favored embodiment of the control means 14 uses a microprocessor and attached components to supply the timing and duration of current interruptions provided by the switch means 16, and the reciprocal timing and duration of the grounding of the output wire 19 by the grounding circuit 30, and also to monitor the load side of the device through the feedback circuit 26. It thus provides an effective programed and/or on demand voltage output regardless of the input voltage above the output voltage. The control means 14 has a radio Frequency interference RFI filter is a low-pass filter that prevents the switch generated ripple from going back into the utility lines of the plant providing the power supply 24. Included in the circuitry in the current best mod is a gas-tube type line surge or transient suppressor that suppresses anything above 470 volts and will shunt to ground up to 20,000 amps in nanoseconds. A series resistor having about 50 watts of dissipation with the voltage drop across it is the current being drawn by the load. A differential amplifier which develops a voltage wave form representative of the load current that is filtered and becomes the AC current reference which is then used for the processor. Also, concurrently, it is generating an AC voltage reference used by the microprocessor which is using high speed tracking of the AC current and Ac voltage. Two low pass flitters which filter the reference AC current and Ac voltage then pass the AC current through the scaling amplifier. The scaling amplifier is used for setting a line current point for the switch. This is then fed into a comparator with hystersis. The output of the cooperator goes from a low to a high state.

The line current limit signal is communicated to the start-up/disable module and resets its output to zero which stops in five seconds. After the five second delay, a 20 millisecond burst of the switching frequency triggers the switching transistors to a full on state for a period of one second which passes the 60 hertz voltage to the load. The pulse-width modulated signal passes through the switching controller circuit which generates a boast signal and senses the input and follows the 60 hertz waveform. When the input of the PWM signal goes from a low to a high state and the switching controller will generate a voltage of 12 volts or higher than the 60 hertz waveform at the moment and is used to turn on the transistors. That signal is then fed to the buffer amplifier which supplies very high peak currents required to turn on the switching transistors.

When the PWM signal goes low, it will drop the boast voltage and turn the switching transistors off through the buffer amplifier. The switching transistors are turned on during the positive transition of the 60 hertz waveform. Then the negative switching transistors are turned on for the excursion below the common input (zero on the 60 hertz).

An emergency bypass is turned on should any problems be detected by the microprocessor causing the switch to default into a continuous "on" state thereby ending current interruption. The output RFI filter is the same as the other RFI filter, however it has a rejection frequency above 9 kHz.

There are two common ground power supplies which are operated from the plus or minus 200 volt supplies which operate at plus and minus 7.5 volts. Then a minus 200 volt supply is connected directly to the control ground. Also referenced to this point is a plus 30.0 volt and a plus 12.0 volt power supply used to supply the control functions of the switch which is referenced to the AC lowest point on the 60 hertz input line power. A filter of a digital type, 60 hertz, fifth order low pas filter which derives its clock frequency from the digital counter which is controlled by the Phase Lock Loop (PPL). The clock frequency is 6 KHZ. The digital counter also supplies a 3 KHZ signal to the pulse-width modulator and is all Phase Locked to the 60 cycle wave form. Then the output goes to the peak detector which develops a DC voltage equal to the positive peak of the sine wave at its input. The output of the peak detector ges into the scaling amplifier which is used to determine the output voltage of the switching circuitry which in the current best mode is substantially 105 volts RMS which then feeds to the inverting amplifier which drives the pulse width modulator to generate any pulse width from 50 to 99 percent duty cycle which then feeds into the disable/start-up module.

The same signal generating the switching transistors to turn the switching means on and off will cause the reciprocal action in the grounding circuit 30 such that when current is turned off, the grounding circuit 30 is engaged to vent electrical energy, and when the current is turned on by the switching means 16 the grounding circuit 30 is disengaged.

While the aforementioned and described controller 14 is the current preferred embodiment of the control means 14 those skilled in the art will realize that changes and alterations may be made and such are anticipated.

FIG. 8-9 depict embodiments of the disclosed device 10 at it can be used in new or retrofit of conventional junction box AC power supples having circuit breakers 32 attached to bus bars 34. In this embodiment multiple switching means 16 would be configured for inclusion in or replacing conventional circuit breakers 32 attached to the bus bar 34 of a junction box 31. This embodiment could be used to allow multiple devices 10 to control multiple circuits with multiple current requirements. In this embodiment, the switch means 16 providing the micro second interruptions of current would be configured to mount into circuit breakers 32 attached in conventional junction boxes 31 of homes and businesses thereby providing easy retrofit installations. The control means 14 would be configured to control each of the multiple independent switching means 16 and would receive feedback from the current and voltage uses of each circuit 12 and adjust the micro second interruptions of current of each individual circuit for the requirements thereof. If the grounding circuit 30 was also included, it would cycle on and off in reciprocal fashion to the switching means 16.

This embodiment would provide for remote monitoring of the information fed to the CPU by the individual feedback circuits in each individual circuit in which the switching means and related components noted herein are inserted. If the control means 14 is connected to a remote monitoring station by modern or other conventional means of remote communication, it would also provide for two way real time control of the power used by the house or business or on each individual circuit thus allowing a remote controller to change the characteristics of the system in real time, or to cut off the power remotely should overloads or non payment occur.

The device as disclosed in the embodiments herein can also function concurrently a high speed circuit breaker as shown installed on the bus bars in FIG. 8. The feedback circuit 26 would be continuously monitoring the voltage and current output of switching means 16 to the circuit in which the device is included. If the current over voltage in the output wire 19 exceeds predetermined levels, the control means 14 would immediately open the switching means 16 and trip the circuit 12. The high speed circuit breaker formed would have a response time of no more than 4 milliseconds after the pre-set current in the monitored line is reached or exceeded. The pre-set current parameters are set by the scaling amplifier which sets the circuit breaker to operate anywhere from 10 to 250 amps or more and is continuously adjustable across that current range. Of course other current ranges could be used depending on the needs of the circuit monitored. When the current set limit is reached, the scaling amplifier will trigger the cooperator to reset the power-up/disable to zero output thereby turning off the switching transistors resulting in cessation of current flow and voltage through the circuit monitored. Optionally a 5 second start-up delay could be installed to monitor the presence of a short or over current conditions and allow the breaker to reset and provide current flow if the line occurrence that triggered the over current condition is removed. Thus the circuit breaker would be "smart" and re-set itself if the condition causing the line over current is cleared elevating the need to manually do so. Or, if monitored from a communicating remote monitoring station, the device could communicate the cleared condition to the station and then be remotely reset to allow current flow.

The disclosed device 10 as shown in FIG. 8 with the switching means 16 inside a circuit breaker 32 can also function as a surge protector when inserted into a circuit with a load thereon. Power line surge protection is provided by the disclosed device any time the input voltage to the device reaches plus or minus 470 volts peak. As disclosed in the specifications and drawings herein of the controller 14, the gas tube will fire and conduct up to a maximum of 100,000 amps to common in less than 5 nanoseconds.

Also disclosed herein the device as shown could function as or include a power controller that will adjust to high load demands. When the device while monitoring the circuit detects a rapid increase in current in a 10 millisecond duration caused by an electrical load such a s large motor turning on or stalling, the device will immediately allow the controller 14 to switch to allow full current and voltage in the circuit for a defined period, currently about one half second, after which time the device returns to normal operating parameters micro chopping the circuit to save power. This is an especially valuable aspect of the disclosed device to allow for the high current demands of starting large motors in air conditioners and refrigerators and other high current components that may be into which the disclosed device is inserted.

In the event of a failure of the device for any reason, the controller 14 activates the emergency bypass restoring uninterrupted current flow in order to insure no power interruptions to the load. As currently disclosed in the drawings the bypass would operate within a two-cycle period of a 60 Hz waveform so that the operation of attached devices is not affected.

FIG. 9 depicts another preferred embodiment of the device would be enclosed in an appropriately dimensioned and configured interface component to allow insertion of the disclosed device between the power supply grid and a home or business. This embodiment depicts the device 10 encapsulated in an interface 36 that would mount between the meter 38 and the junction box 31 and enclosed bus bars 34 of a home or business and provide the micro second current interruptions to the entire home or business electrical system as a whole. This embodiment while not providing the individual circuit monitoring capabilities of other embodiments, would be especially easy to install by simply removing and remounting the meter 38 with the device interfaced in-between and completing the circuit from the junction box 31 to the power supply 24 from the local power grid.

As noted earlier, the disclosed device can easily function as a low cost constant voltage line conditioner best shown in FIG. 15 which uses the same basic design as FIGS. 6a and 6b. The device in this configuration uses the same unique multiple switching of the current on both sides of each AC oscillation. Constant voltage line conditioners are used for protecting electrical devices from over-voltage and for filtering out voltage transients, noise and surges. The device described herein is a low cost device that has all the attributes of a high end line conditioner and due to its inherent voltage regulation characteristics; the device acts as a line conditioner. No additional parts or substitutions are required as the line conditioner embodiment uses all the components listed in FIGS. 6A and 6B.

Also as noted above and shown in FIG. 8 the disclosed device easily can function as a high speed circuit breaker. This embodiment is a fast response electrical circuit breaker that reacts to an over current condition within 4.0 msec. response time after the peak current has been reached. By substituting the variable resistor in the CURRENT SCALING AMP, with an adjustable knob or other means to the desired current trip level up to 300 amps. The high-speed circuit breaker utilizes components in the blocks as described in FIGS. 6A and 6B. In FIG. 6A: BLOCKS 2, 6, 7, 8, 9, 10, 11, 12, AND 13 and in FIG. 6B blocks 1-9. In Block 2, the AC CIRCUIT SHUNT, has two outputs; one is the reference voltage and the other is the voltage drop across the AC shunt resistance and feeds the voltage to the differential amp. In Block 6, the DIFFERENTIAL AMP takes he difference between the input and output current and amplifies it. This current is then feed into the 60 HZ low pass filter. Block 8, 60 HZ LOW PASS FILTER, removes the transient voltage and noise and feeds the signal to the CURRENT SCALING AMP. Block 9, CURRENT SCALING AMP, amplifies the signal and feeds it into the COMPARATOR W/HYSTERISIS.

At Block 9 the CURRENT SCALING AMP, amplifies the signal and feeds it into the COMPARATOR W/HYSTERISIS. The SCALING AMP has a fixed reference with hysterisis where an adjustable knob is inserted to set the breaker trip for any desired current level. The COMPARATOR, BLOCK 12 the connects to BLOCK 2, FIG. 6B at 100% POWER is a switch that turns the AC voltage off which then connects to the 8 CHANNEL ANALOG SWITCH, block 3 turns off the SENSE BOOST SWITCHING CONTROL, block 13 then connects to the BUFFER AMP, BLOCK 10, which turns the AC SWITCHING TRANSISTOR, BLOCK 7 "off". Then after 5 seconds, the power will be attempted to be turned on again in sequential order, only if the electrical fault or short circuit has been removed, otherwise it will remain "off".

FIG. 10 depicts an embodiment of the device used for a light dimmer or combination dimmer energy saver utilizing the majority of components of FIGS. 6A and 6B. The depicted analog or other adjustable switch provides the user the ability to change the brightness of the attached lightbulb.

FIG. 11 shows an embodiment of the device which would function as a voltage regulator utilizing the major components of FIGS. 6A and 6B.

FIG. 12 depicts how the device would work as a remote circuit breaker and energy consumption reporting device and in FIG. 10 in conjunction with the major components of FIGS. 6A and 6B. As shown, the device uses a means for communication with a remote site of the current power usage and or the total aggregate electrical power passing through the device over a time period. This way the total power consumed at the location of the device can be monitored and communicated in real time or at delayed times to the remote station. This embodiment allows for a remote deactivation of the device to cease power flow and would work especially well for a remote circuit breaker if the line were communicating power to a major power consumer such as air conditioner or a home. It uses the same novel multiple switching of the switching means during both oscillations of the AC current cycle. However it provides a means to communicate or signaling of the switching means to move to an open or current interrupting position and remain in that position. In this manner it will interrupt the energy flow as long as the switch is open. In the case of a major power using device, if the power being consumed in real time were above certain criteria set for the device that error could be monitored remotely and the device would be signaled remotely to open the switch and interrupt the electrical power until signaled to close the switching means and start power flowing again.

In the case of a home or business, the device as configured in this embodiment would provide for real time monitoring of energy use and either allow for shut off of the power if the bill were not paid or for prepaid power payments which would allow the user electricity until the payment is exhausted. It would work in much the same fashion with the current and aggregate power consumption being transmitted by telephone, internet, wireless, or other means of transmission of the information about power usage to a remote location. If power needs to be interrupted to the load it can be then interrupted for the duration that the switching means remains in said open position, and signaled to restart by a signal to the device to start the switching means operating again to close and allow power.

FIG. 13 depicts the device of 6A and 6B used for a motor controller using the major portions of the components of FIGS. 6A and 6B and the novel multiple switching during each oscillation of the current which would provide the ability to control the speed of an electric motor connected as the load.

FIG. 14 shows a resistance load energy saver embodiment of the device which would work well with resistance type loads such as lights, toasters, or other appliances. This embodiment uses the major components of FIGS. 6A and 6B and the novel multiple interruption of current flow on during both halves of each AC current oscillation.

FIG. 15 depicts the device used for line conditioning which functions substantially the same as the device of FIGS. 6a and 6b and uses the novel AC switching disclosed above in the other embodiments.

Additionally, it has been found with experimentation, that as an energy savings apparatus, the device herein also functions to provide heretofore unobtainable power factor correction in an AC circuit feeding an inductive load such as an electric motor. As shown in FIG. 16-17, the offset of voltage and current in an AC circuit is a problem causing inefficiency in electrical motors and many inductive type loads engaged on a single phase or especially a three phase AC circuit. Power factor is the ration between the KW and the KVA drawn by an electrical load where the KW is the actual load power and the KVA is the apparent load power. Power factor is essentially a measure of how effectively the current is being converted into useful work output and more particularly is a good indicator of the effect of the load current on the efficiency of the supply system. A load with a power factor of 1.0 as shown in FIG. 17 wherein the graph of both current and voltage are aligned in the oscillation depiction is generally accepted as the most efficient loading of the AC supply and a load. Such an alignment of current and voltage occurs with resistive loads such as heaters and incandescent bulbs. However, in inductive loads such as electric motors, the power factor will decrease as depicted in FIG. 16 where voltage and current are offset and will result in much higher losses in the supply system.

The device 10 herein has through experimentation found to be a excellent means for power factor correction in AC circuits, especially where the load 22 is inductive such as electric motors. It can function in this fashion as depicted in FIGS. 1-3 if the controller is optimized for that function or the device can be optimized as in FIG. 18 to include additional voltage and current sensors and a power factor controllers.

The device 10 it has been found can be employed specifically as a power factor control with a focus on correcting the offset of voltage and current in grids supplying inductive loads. This is especially useful where a grid might supply a large number of high horsepower inductive motors since enough of such device connected to the grid can actually bring the grid down or severely affect it due to the high amount of offset of voltage and current fed back into the grid by say a factory using such motors.

Used primarily as a power factor correction device and to achieve energy savings also noted above, the device 10 will work constructed as in the devices of FIGS. 1 and 2 for a single phase circuit and as in FIG. 3 for a three phase circuit. The operational characteristics are explained above. Used in this fashion, the control 14 can be adjusted to provide the best power factor correction based on the readings obtained by the control noted above. However if desired and employed with a priority of function for power factor correction, the device 10 would have a control 14 which would control the number and duration said of plurality of individual interruptions biased to best reduce any difference in phase between said alternating current and said voltage. This can be done by preprogramming the control 14 with optimum calculated numbers and durations of interruptions which is currently about 10 to 100 per cycle.

If optimized for this function, to allow for more adjustment of the power factor between a maximum and minimum range, it can be enhanced by insertion of a phase detection means 50 which would communicate with a voltage detection means 52 and a current sampling means 54 both communicating with any line being interrupted. The voltage detection means 52 can be essentially any means for reading the voltage of any of the output wires 19 that communicates with the load 22 in the chosen circuit and communicating the read voltage at a time to the phase detection means. The current sampling means 54 also is readily available conventionally in a wide variety of components and would read the current at the same point in time as the voltage detection means and communicate that reading also to the phase detection means which would adjust the operation of the controller as to number and duration of the plurality of interruptions in the line to optimize the power factor. As is obvious to those skilled in the art, a number of different conventional electronic components are available for both voltage and current sampling and the use of such conventional devices as would fit the purpose is anticipated. The phase detection means 50 would communicate a signal to the control 14 which would use software or other means to calculate the best number and duration of the interruptions to correct the power factor of the line or lines engaged to a load 22. The phase detection means could essentially be handled by the software which receives the readings from the voltage and current sampling devices and uses an algorithm to arrive at a power factor at the time frame in which the data is received. Communicating that current factor to the controller with instructions on changes to timing and duration of the interruptions would follow naturally. Further, the controller itself could be software driven and provide both the controller and phase detection based on inputs from the voltage and current sampling devices.

Experimentation has shown that a preprogrammed controller to create the current interruptions in both the positive and negative oscillations and interrupts the current flow from about 10 to 100 times per cycle works well for minimal correction of the power factor if a simpler device is advantageous in certain installations. Also, as in the devices above, the interruptions can be made a neutral line or in one of the energized lines and in the cases of a three phase circuit, in all of the lines such as that shown in FIG. 3.

While a significant improvement in power factor of about 10 to 20 percent is achieved in the simplest mode of the device 10 wherein a plurality of interruptions is simply employed, the most improvement and the favored mode of the device employed for power factor correction would employ the means for grounding the interrupted line during the switched interruptions shown as the grounding circuit 30 depicted in FIGS. 1-3. By grounding the line all reactive power left in the line feeding a motor or similar load 22 that is inductive, is removed. In this manner, if the timing and duration of the interruptions are adjusted to maximize the power factor correction a power factor of 1.0 can be achieved as shown in FIG. 17 thereby maximizing the energy efficiency of the connected inductive load, and protecting the grid supplying the load from the potential problems from the phase offset that can occur, especially with many inductive loads on the grid.

This grounding achieves the resulting power factor control and correction on both single phase and three phase AC circuits by interruptions in the lines feeding the inductive load as shown in FIGS. 1-3. Used as a method, the steps would involve providing alternating current power through a line communicating between a source and a an inductive load; interrupting current flow though the line by creating a plurality of individual interruptions in current flow during both said negative and positive oscillations; and controlling the number and duration of said plurality of interruptions to reduce the difference in phase between the alternating current and said voltage. The additional step of grounding said line during interruptions would maximize the power factor correction.

Although the invention has been described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications, as would occur to those skilled in the art, are considered to be within the scope of this invention as broadly defined in the appended claims.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A power factor control apparatus for an inductive load powered by an AC circuit, comprising:
   a line for communicating alternating current flow at a voltage, between a source and an inductive load;
   switch means for interrupting said alternating current flow through said line for a plurality of individual interruptions, during at least one of positive and negative current oscillations; and
   control means for controlling the number and duration of said plurality of individual interruptions to thereby reduce any difference in phase between said alternating current and said voltage.

2. The power factor control according to claim 1 additionally comprising:
   phase detection means communicating with a voltage detection means and a current sampling means to thereby determine a phase difference; and
   said phase detection means communicating with said control means.

3. The power factor control according to claim 1 wherein said control means controls said interruptions in both said positive and negative oscillations and interrupts said current flow from about 10 to 100 times per cycle.

4. The power factor control according to claim 1 wherein said control means interrupts current flow in a neutral line.

5. The power factor control according to claim 1 wherein said control means interrupts current flow in an energized line.

6. The power factor control according to claim 2 wherein said control means controls said interruptions in both said positive and negative oscillations and interrupts said current flow from about 10 to 100 times per cycle.

7. The power factor control according to claim 2 wherein said control means interrupts current flow in a neutral line.

8. The power factor control according to claim 2 wherein said control means interrupts current flow in an energized line.

9. The power factor control according to claim 1 further comprising:
   means for grounding said line during said interruptions.

10. The power factor control according to claim 2 further comprising:
    means for grounding said line during said interruptions.

11. The power factor control according to claim 4 further comprising:

means for grounding said line during said interruptions.

12. The power factor control according to claim 5 further comprising:

means for grounding said line during said interruptions.

13. The power factor control according to claim 7 further comprising:

means for grounding said line during said interruptions.

14. The power factor control according to claim 8 further comprising:

means for grounding said line during said interruptions.

15. The power factor control according to claim 1 further comprising:

said AC circuit being a three phase circuit having three of said lines;

switch means for interrupting said alternating current flow through each of said lines for a plurality of individual interruptions, during at least one of said positive and negative current oscillations of each of said respective lines; and said control means for controlling the number and duration of said plurality of individual interruptions, controlling said interruptions in each of said lines, to thereby reduce any difference in phase between said alternating current and said voltage.

16. The power factor control according to claim 2 further comprising:

said AC circuit being a three phase circuit having three of said lines;

switch means for interrupting said alternating current flow through each of said lines for a plurality of individual interruptions, during at least one of said positive and negative current oscillations of each of said respective lines; and said control means for controlling the number and duration of said plurality of individual interruptions, controlling said interruptions in each of said lines, to thereby reduce any difference in phase between said alternating current and said voltage.

17. The power factor control according to claim 15 further comprising:

means for grounding each of said lines during said interruptions.

18. The power factor control according to claim 16 further comprising:

means for grounding each of said lines during said interruptions.

19. A method of factor control for an inductive load on an AC circuit carrying AC power having negative and positive oscillations, comprising the steps of:

providing alternating current power having negative and positive oscillations, from a source through a line to an inductive load;

interrupting current flow though said line for a plurality of individual interruptions during each of said negative and positive oscillations;

grounding said line during said interruptions to remove residual electrical energy generated by load inductance; and monitoring said line for the difference in phase between said alternating current and said voltage and continually adjusting the number and duration of said interruptions minimize the offset of current and voltage.

20. A method of factor control for an inductive load on a three phase AC circuit carrying AC power having negative and positive oscillations to an inductive load, comprising the steps of:

providing alternating current power having negative and positive oscillations, from a source through three lines to an inductive load;

interrupting current flow though each of said lines for a plurality of individual interruptions during each of said negative and positive oscillations;

grounding said lines during said interruptions to remove residual electrical energy generated by load inductance; and monitoring said lines for the difference in phase between said alternating current and said voltage and adjusting the number and duration of said interruptions to minimize the offset of current and voltage.

* * * * *